Mar. 13, 1923.
J. W. FRENCH
1,448,289
SURVEYING INSTRUMENT, LEVEL, AND THE LIKE
Filed Oct. 29, 1920      2 sheets-sheet 1
FIG. 5.
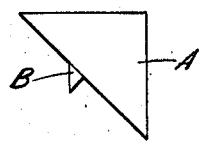
FIG. 7.
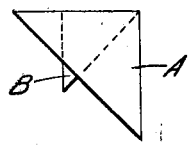
FIG. 3.
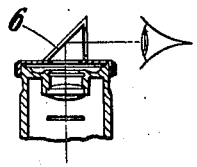
FIG. 6.
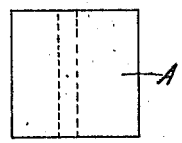
FIG. 8.
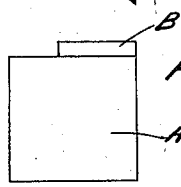
FIG. 1.
FIG. 2.
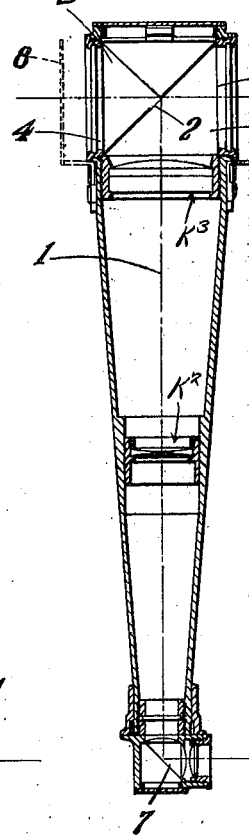
FIG. 4.
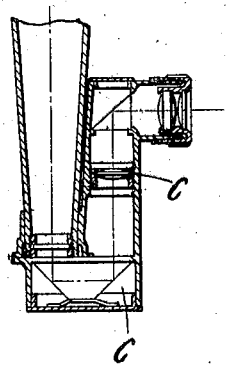
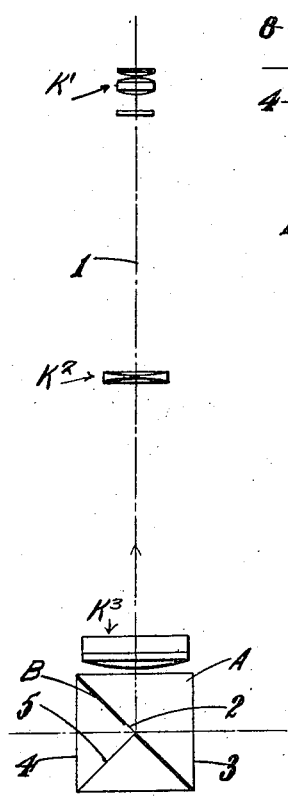
INVENTOR
James Weir French
By J. Walter Fowler,
Atty.

Mar. 13, 1923.  
J. W. FRENCH  
1,448,289  
SURVEYING INSTRUMENT, LEVEL, AND THE LIKE  
Filed Oct. 29, 1920   2 sheets-sheet 2

INVENTOR  
James Weir French,  
By J. Walter Fowler  
Atty.

Patented Mar. 13, 1923.

1,448,289

UNITED STATES PATENT OFFICE.

JAMES WEIR FRENCH, OF ANNIESLAND, GLASGOW, SCOTLAND, ASSIGNOR TO BARR AND STROUD, LIMITED, OF ANNIESLAND, GLASGOW, SCOTLAND.

SURVEYING INSTRUMENT, LEVEL, AND THE LIKE.

Application filed October 29, 1920. Serial No. 420,535.

(GRANTED UNDER THE PROVISIONS OF THE ACT OF MARCH 3, 1921, 41 STAT. L., 1313.)

*To all whom it may concern:*

Be it known that I, JAMES WEIR FRENCH, a subject of the King of Great Britain and Ireland, and of Caxton Street, Anniesland, Glasgow, Scotland, have invented new and useful Improvements in or Connected with Surveying Instruments, Levels, and the like (for which application for patent in Great Britain has been made No. 154,958, dated July 28, 1919), of which the following is a specification.

This invention relates to the production of a new type of surveying instrument comprising a telescope provided with two reflectors fixed to the telescope and located outside the incident end thereof, the two reflectors being arranged to direct into the telescope rays proceeding in alignment from opposite directions normal to the axis of the telescope, the telescope with its reflectors being mounted capable of rotation about the axis of the telescope and mounted capable of angular adjustment about a trunnion axis transverse to the telescope and normal to the direction of the said rays, which trunnion axis turns with the telescope, the instrument being for use in determining levels or directions normal to an axis, hereinafter referred to as the axis of position, and in use be subjected to a preliminary process for setting in order to bring the axis of position normal to the direction in which the observations are to be subsequently made, the preliminary process involving successive observations in one and the same directions being made on an object by using the two reflectors alternately, in the process of which the instrument is rotated about the axis of the telescope, and by angular adjustment about the trunnion axis the instrument may thereby be set, in accordance with the mean of the observations made by using the two reflectors alternately, so that observations by both reflectors coincide each with the cross wire with which the eyepiece of the telescope may be provided. When this is done the axis of the telescope becomes the axis of position and is truly normal to the direction of the object, and surveying operations may then be proceeded with about that axis in the process of which one only of the reflectors is required to be made use of. The other reflector may be screened.

Instruments according to this invention may be so constructed that an erect image of an object, a staff for example, under observation may be obtained without the use of an erecting eyepiece and that the tacheometric angle may be reckoned from a vertical axis.

Reflectors suitable for the purposes of this invention may comprise a prism combination so constructed that light entering from one direction is reflected at right angles by an oblique surface of the prism combination into the telescope objective, and light proceeding in alignment from the opposite direction is reflected at right angles into the telescope objective from another oblique surface of the prism combination normal to the first mentioned surface. The second beam may be transmitted through the first oblique surface, the second oblique surface being situated behind the first surface or they may be disposed side by side, and the relative position of the two reflecting surfaces must be such that the optical axis of the telescope must pass through the line of intersection of the reflecting surfaces or through a line defined by the intersection of two planes containing the respective reflecting surfaces.

Some examples of construction according to this invention will now be described with reference to the accompanying drawings, in which:—

Figure 1 is an elevation illustrating the optical parts of a telescope and prism combination.

Figure 2 is a sectional elevation illustrating a modified arrangement of telescope and prism combination.

Figure 3 is a sectional elevation of an eyepiece prism for use in association with an instrument of the character illustrated at Figure 1.

Figure 4 is a sectional elevation of an optical system for use in association with instruments according to this invention, the form illustrated being applicable for association in construction with an instrument of the character illustrated at Figure 2.

Figures 5 and 7 are elevations and Figures 6 and 8 are plans, respectively, illustrating two modified forms of prism combinations.

Figure 9:
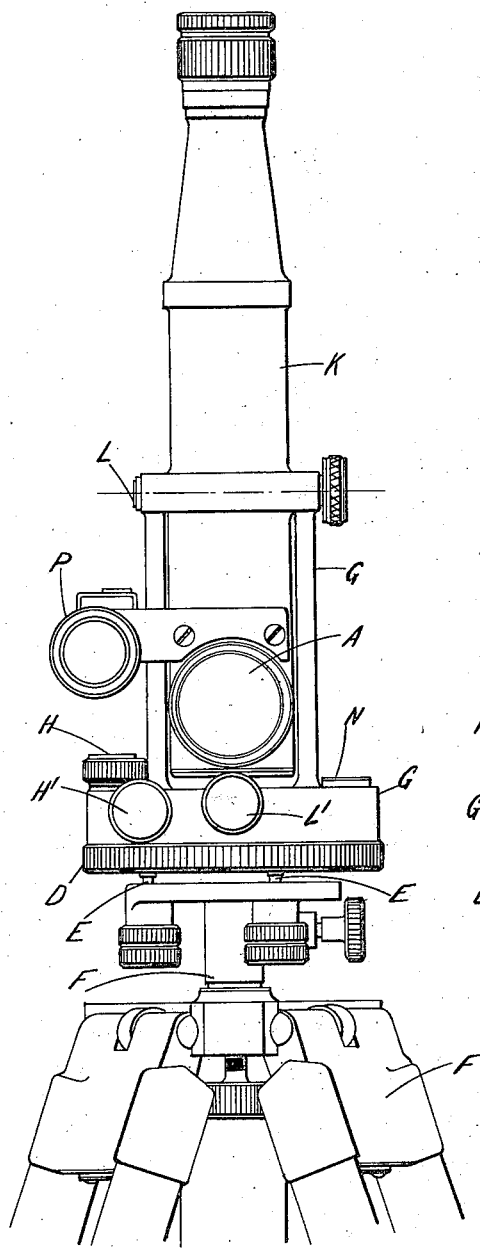
Figure 9 is an elevation and Figure 10 is a sectional elevation of an instrument of the character illustrated at Figure 1 with a mounting and associated gear.

In the constructions illustrated at Figures 1 and 2 the optical parts of the telescope are designated generally $K^1$, $K^2$ and $K^3$ of which $K^3$ is at the incident end of the telescope, and the prism combinations provided comprise in each case two right angle prisms, a prism A arranged with its hypothenusal face at 45° to the optical axis 1 of the telescope, which axis, for example, will be assumed to be vertical and constitute the axis of position. One of the right angle faces of the prism A is arranged normal to the axis 1 of the telescope. A part of the hypothenusal face of the prism A is made light reflecting, for instance, by silvering, and the remaining portion in the region at the centre of the face is not silvered to provide a window 2 through which light from a prism B is adapted to pass. The prism B is placed with one of its right angle faces against the hypothenusal face of the prism A and arranged so as to cover the window 2, the hypothenusal face of the prism B being normal to the incident light. The arrangement in this case is such that the prism A, has an incident face 3, and the prism B an incident face 4 which are presented in opposite directions, so that light passing into the prism A is reflected by the silvered part of its hypothenusal face into the telescope and light passing into the prism B is reflected by the right angle face 5 which is made light reflecting through the window 2 into the telescope.

An instrument of this character is mounted capable of rotation about the axis of its telescope and of being set, say, with its axis approximately vertical, coincident more or less with the axis of position and then of being tested to ascertain whether the axis of rotation 1 is truly the axis of position by making two observations on an object, a staff for example, one by reflection from the prism A the other observation by reflection from the prism B, and if these observations are not coincident adjustment is required, suitable provision for which is made.

With an instrument of the character illustrated at Figure 1, the observer looks down vertically into the eyepiece of the telescope and views the image of the staff which appears erect but laterally reversed owing to the combined effect of the telescope objective and the oblique reflecting faces of the prism combination A, B. If desired provision may be made whereby the observer looks in horizontally, for which purpose there may be placed above the eyepiece an eyepiece prism 6 as shown at Figure 3 comprising an oblique reflecting surface. In this case the staff will appear inverted and laterally reversed, necessitating the use of an erecting eyepiece or prism system if an erect image is desired. The eyepiece prism 6 may be mounted capable of rotation about the axis of the telescope in order that its attitude relatively to the observer may be maintained when the telescope is rotated about the vertical axis.

In the arrangement illustrated at Figure 2, the position of the principal parts is inverted the prism combination A, B being at the top and the eyepiece at the bottom. In this case an eyepiece prism 7 comprising an oblique reflecting surface is provided in front of the eyepiece so arranged that the observer can look in horizontally or obliquely. The eyepiece prism 7 may be mounted capable of rotation so as to maintain its attitude relatively to the observer when the telescope and line of sight are rotated.

Between the observer's eye and the field of view of the telescope there may be provided as indicated at Figure 4 an optical system C of prisms and lenses so arranged as to erect the image when the observer is facing the object and enable the level of the line of sight of the observer's eye to be arranged at any desired position relatively to the line of sight of the prism combination A, B.

In any of the arrangements shutters 8, 8, see Figure 2, for intercepting the rays proceeding in alignment from opposite directions normal to the axis of the telescope to obscure either of the lines of sight may be provided.

In a surveying telescope of a known type in which the focussing is effected by a displacement of the eyepiece the tacheometric angle is measured from the front focus of the objective, that is from a point on the object side of the objective equal to the focal length. When the focussing is done by means of the displacement of an internal lens the position from which the tacheometric angle is measured can be varied. In this invention the focussing lens may be so arranged that the tacheometric angle is reckoned from the vertical axis of rotation of the telescope.

Figures 5 and 6 illustrate a modified form of prism combination in which the prism B is formed of a width equal to the width of the window 2 which extends as a band across the face of the prism A.

Figures 7 and 8 illustrate a modified form of prism combination comprising prisms A and B arranged side by side, in which case no window is provided.

Figure 10:
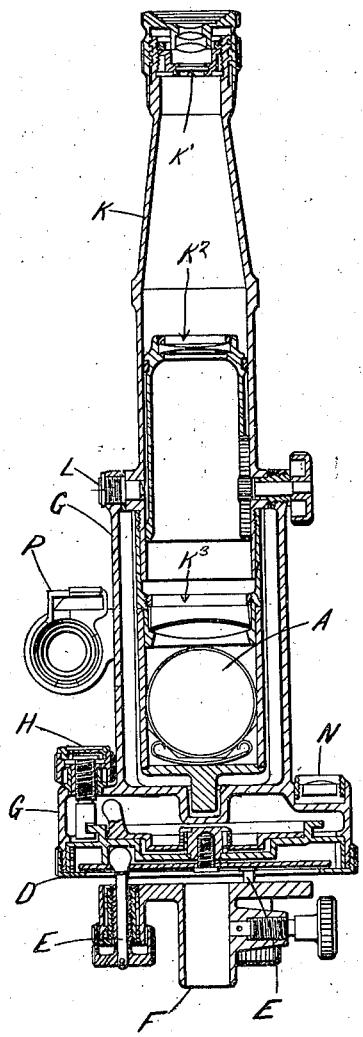

The instrument illustrated at Figures 9 and 10, which is of the character described with reference to Figure 1, comprises a base part D which is supported on levelling feet E carried by a stand F. Upon the base part D a frame G is mounted capable of rotation about the vertical axis thereof, which may be rotated freely by hand when a screw H is released, or when the screw H is tightened rotated by means of gearing operated by a head $H^1$.

Upon the frame G, the instrument comprising the telescope designated K and prisms A, B, of which A only is seen, is mounted to swing about a horizontal trunnion support the axis L of which is normal to the rays proceeding in alignment which are reflected into the telescope by the prisms A, B, angular adjustment about the axis L being produced by operation of gear actuated by the head $L^1$.

Mounted on the frame G is a spirit level N provided for ascertaining when the frame G is approximately level, and attached to the telescope K is an adjustable spirit level P arranged longitudinally normal to the trunnion axis L, capable of adjustment relatively to the line of sight either by an inclination of the spirit level P or by an alteration of the position of an index, with which the spirit level P is provided, relatively to the bubble, in which case either the index or the bubble may be displaced longitudinally. Thus the prism combination A, B and with it the telescope K and the spirit level P is rotatable about a more or less vertical axis in order to direct either the forward or the backward line of sight upon the staff being observed upon.

The method of adjusting a surveying level made in accordance with this invention may, for example, be as follows:—

The verticality of the telescope is roughly adjusted in both planes with reference to the rough level N by means of the adjustable feet. The observer directs the line of sight in azimuth upon the staff and notes the reading on the cross wire of the eyepiece and also the reading of the spirit level P. He then rotates the telescope about the vertical axis through 180° and views the staff along the second line of sight. He then swings the telescope about the horizontal axis L until the index of the spirit level P occupies the same position as before relatively to the bubble and again notes the reading of the staff at the cross wires of the telescope eyepiece. By a suitable swinging movement of the telescope about the axis L he then sets the cross wire upon the mean indication of two previous staff readings, and by a suitable longitudinal movement of say the index of the spirit level P he restores the original relative position of index and the bubble. The line of sight then lies in a plane that is truly level in accordance with the indications of the spirit level P.

I claim:—

1. An instrument consisting of a telescope, reflectors fixed to the telescope located outside its incident end, the reflectors having two reflecting surfaces at right angles to one another arranged each at 45° to the optical axis of the telescope and presented towards the telescope for directing into the telescope rays proceeding in alignment from opposite directions normal to the axis of the telescope, the relative positions of the two reflecting surfaces being such that the optical axis of the telescope passes through a line defined by the intersection of two planes containing the respective reflecting surfaces, a frame mounted capable of rotation about an upright axis, and a trunnion support on the frame by which the telescope is carried, the axis of which trunnion support is transverse to the telescope and normal to the direction of the said rays and turns with the telescope and the frame, for the purposes set forth.

2. An instrument consisting of a telescope, a prism combination fixed to the telescope located outside its incident end, the prism combination having two reflecting surfaces at right angles to one another arranged each at 45° to the optical axis of the telescope and presented towards the telescope for directing into the telescope rays proceeding in alignment from opposite directions normal to the axis of the telescope, the relative positions of the two reflecting surfaces being such that the optical axis of the telescope passes through a line defined by the intersection of two planes containing the respective reflecting surfaces, a frame mounted capable of rotation about an upright axis, and a trunnion support on the frame by which the telescope is carried, the axis of which trunnion support is transverse to the telescope and normal to the direction of the said rays and turns with the telescope and the frame, for the purposes set forth.

3. An instrument consisting of a telescope, a prism combination fixed to the telescope located outside its incident end, the prism combination having a first and a second reflecting surface at right angles to one another arranged each at 45° to the optical axis of the telescope and presented towards the telescope, a window in the first reflecting surface, the second reflecting surface being situated behind the first, for directing into the telescope rays proceeding in alignment from opposite directions normal to the axis of the telescope, the relative positions of the two reflecting surfaces being such that the optical axis of the telescope passes through a line defined by the intersection of two planes containing the respective reflecting surfaces, a frame mounted capable of rotation about an upright axis, and a trunnion support on the frame by which the telescope is carried, the axis of which trunnion support is transverse to the telescope and normal to the direction of the said rays and turns with the telescope and the frame, for the purposes set forth.

4. An instrument consisting of a telescope, reflectors fixed to the telescope located outside its incident end, the reflectors having two reflecting surfaces at right angles to one another arranged each at 45° to the optical axis of the telescope and presented towards the telescope for directing into the telescope rays proceeding in alignment from opposite directions normal to the axis of the telescope, the relative positions of the two reflecting surfaces being such that the optical axis of the telescope passes through a line defined by the intersection of two planes containing the respective reflecting surfaces, a frame mounted capable of rotation about an upright axis, a trunnion support in the frame by which the telescope is carried, the axis of which trunnion support is transverse to the telescope and normal to the direction of the said rays and turns with the telescope, and an adjustable spirit level attached to the telescope arranged longitudinally normal to the trunnion axis, for the purposes set forth.

5. An instrument consisting of a telescope, reflectors fixed to the telescope located outside its incident end, the reflectors having two reflecting surfaces at right angles to one another arranged each at 45° to the optical axis of the telescope and presented towards the telescope for directing into the telescope rays proceeding in alignment from opposite directions normal to the axis of the telescope, the relative positions of the two reflecting surfaces being such that the optical axis of the telescope passes through a line defined by the intersection of two planes containing the respective reflecting surfaces, a frame mounted capable of rotation about an upright axis, a trunnion support on the frame by which the telescope is carried, the axis of which trunnion support is transverse to the telescope and normal to the direction of the said rays and turns with the telescope, and means for screening one of the reflectors, for the purposes set forth.

6. An instrument consisting of a telescope, reflectors fixed to the telescope located outside its incident end, the reflectors having two reflecting surfaces at right angles to one another arranged each at 45° to the optical axis of the telescope and presented towards the telescope for directing into the telescope rays proceeding in alignment from opposite directions normal to the axis of the telescope, the relative positions of the two reflecting surfaces being such that the optical axis of the telescope passes through a line defined by the intersection of two planes containing the respective reflecting surfaces, a stand, levelling feet carried by the stand, a base part supported on the levelling feet, a frame mounted on the base part capable of rotation about a vertical axis on which frame the telescope is mounted to swing about a horizontal trunnion axis, means for rotating said frame, gear for adjusting the instrument angularly about the trunnion axis, a spirit level on the frame, an adjustable spirit level attached to the telescope, and means for screening one of the reflectors, for the purposes set forth.

JAMES WEIR FRENCH.